(12) United States Patent
Akatsuka et al.

(10) Patent No.: US 12,515,658 B2
(45) Date of Patent: Jan. 6, 2026

(54) MOVING BODY OPERATION SYSTEM

(71) Applicant: TOYOTA JIDOSHA KABUSHIKI KAISHA, Toyota (JP)

(72) Inventors: Kosuke Akatsuka, Mishima (JP); Rio Suda, Toyota (JP); Hirofumi Momose, Numazu (JP); Yuki Suehiro, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 18/469,797

(22) Filed: Sep. 19, 2023

(65) Prior Publication Data

US 2024/0166206 A1 May 23, 2024

(30) Foreign Application Priority Data

Nov. 18, 2022 (JP) ................. 2022-184817

(51) Int. Cl.
*B60W 30/14* (2006.01)
*B60W 10/08* (2006.01)
*B60W 10/20* (2006.01)
*B60W 50/14* (2020.01)

(52) U.S. Cl.
CPC .......... *B60W 30/143* (2013.01); *B60W 10/08* (2013.01); *B60W 10/20* (2013.01); *B60W 50/14* (2013.01); *B60W 2050/146* (2013.01); *B60W 2556/45* (2020.02); *B60W 2756/10* (2020.02)

(58) Field of Classification Search
None
See application file for complete search history.

(56) References Cited

U.S. PATENT DOCUMENTS

| | | | |
|---|---|---|---|
| 8,860,787 B1 * | 10/2014 | Neven .................... | H04N 7/152 348/51 |
| 8,903,568 B1 * | 12/2014 | Wang .................... | G05D 1/0038 701/2 |
| 10,569,740 B2 * | 2/2020 | Lee .......... | H04W 4/40 |
| 10,606,268 B2 * | 3/2020 | Kim ....... | B60W 50/10 |
| 11,079,753 B1 * | 8/2021 | Roy ........ | G05D 1/028 |
| 11,181,909 B2 * | 11/2021 | Bando .............. | G05D 1/0038 |
| 11,215,982 B2 | 1/2022 | Urano et al. | |

(Continued)

FOREIGN PATENT DOCUMENTS

| | | | | |
|---|---|---|---|---|
| CN | 102442314 A | * | 5/2012 | ............ B60W 50/14 |
| CN | 202861787 U | * | 4/2013 | |

(Continued)

*Primary Examiner* — Kevin R Steckbauer
(74) *Attorney, Agent, or Firm* — SoraIP, Inc.

(57) ABSTRACT

A moving body operation system including a mobile terminal communicatively connected to a moving body that a user can ride in, the mobile operation system comprising: an inclination detection unit that detects an inclination direction and an inclination angle of the mobile terminal; a movement setting unit that sets a traveling direction of the moving body based on an inclination direction of the mobile terminal, and sets a target speed or a target acceleration of the moving body based on an inclination angle of the mobile terminal; and a movement control unit that performs steering control of the moving body based on the traveling direction, and performs speed control of the moving body based on the target speed or the target acceleration.

11 Claims, 6 Drawing Sheets

(56) References Cited

U.S. PATENT DOCUMENTS

| | | | |
|---|---|---|---|
| 11,325,618 B2 | 5/2022 | Umeda | |
| 11,485,389 B2 * | 11/2022 | Lee | B60K 35/10 |
| 2013/0109272 A1 * | 5/2013 | Rindlisbacher | A63H 30/04 |
| | | | 446/454 |
| 2014/0313127 A1 * | 10/2014 | Deng | G06F 3/017 |
| | | | 345/156 |
| 2016/0179218 A1 * | 6/2016 | Rosenzweig | G06F 3/0346 |
| | | | 345/156 |
| 2017/0151499 A1 * | 6/2017 | Hirai | A63F 13/2145 |
| 2018/0088577 A1 * | 3/2018 | Kim | B60W 30/00 |
| 2019/0126918 A1 * | 5/2019 | Takayanagi | B60W 50/0097 |
| 2019/0137999 A1 | 5/2019 | Taguchi et al. | |
| 2019/0217816 A1 * | 7/2019 | Lee | H04W 4/40 |
| 2019/0258247 A1 * | 8/2019 | Bando | B62D 1/00 |
| 2020/0041992 A1 * | 2/2020 | Nagashima | G06F 3/04847 |
| 2020/0209888 A1 | 7/2020 | Sakai et al. | |
| 2020/0326702 A1 | 10/2020 | Iwamoto et al. | |
| 2021/0041894 A1 | 2/2021 | Urano et al. | |
| 2021/0055741 A1 | 2/2021 | Kawanai et al. | |
| 2021/0058173 A1 | 2/2021 | Otaki et al. | |
| 2021/0072743 A1 | 3/2021 | Otaki et al. | |
| 2021/0080943 A1 | 3/2021 | Iwamoto et al. | |
| 2022/0024491 A1 * | 1/2022 | Lee | B60K 35/28 |
| 2022/0288770 A1 * | 9/2022 | Horiguchi | G05D 1/246 |
| 2022/0291665 A1 * | 9/2022 | Sato | B25J 19/02 |
| 2022/0334597 A1 * | 10/2022 | Nishi | B25J 11/001 |
| 2023/0028871 A1 * | 1/2023 | Noma | G05D 1/227 |
| 2024/0166206 A1 * | 5/2024 | Akatsuka | B60W 10/08 |

FOREIGN PATENT DOCUMENTS

| | | | | |
|---|---|---|---|---|
| CN | 107867296 A | * | 4/2018 | B60W 60/005 |
| CN | 108023727 A | * | 5/2018 | H04L 63/0838 |
| CN | 110027506 A | * | 7/2019 | B60R 25/241 |
| CN | 111324102 A | * | 6/2020 | G05B 23/0213 |
| CN | 107867296 B | * | 9/2020 | B60W 60/0051 |
| CN | 108023727 B | * | 4/2021 | H04L 9/0866 |
| CN | 111086509 B | * | 9/2021 | B60W 30/0956 |
| DE | 102012211041 A1 | * | 1/2014 | B60K 35/28 |
| DE | 102018133014 A1 | * | 8/2019 | B62D 1/00 |
| DE | 102018133014 B4 | * | 7/2024 | G06V 20/56 |
| EP | 3300979 A1 | * | 4/2018 | B60W 60/0051 |
| EP | 3300979 B1 | * | 5/2019 | B60W 60/0051 |
| JP | 2004-362466 A | | 12/2004 | |
| JP | 2007-265288 A | | 10/2007 | |
| JP | 2015018110 A | * | 1/2015 | |
| JP | 5711312 B2 | * | 4/2015 | |
| JP | 2015-069733 A | | 5/2015 | |
| JP | 2017125768 A | * | 7/2017 | |
| JP | 2019144756 A | * | 8/2019 | B62D 15/027 |
| JP | 2020-101987 A | | 7/2020 | |
| JP | 7032950 B2 | * | 3/2022 | G06V 20/56 |
| JP | 2022-063056 A | | 4/2022 | |
| JP | 2022106614 A | * | 7/2022 | |
| JP | 2024160630 A | * | 11/2024 | B60W 50/14 |
| KR | 20120034297 A | * | 4/2012 | G06F 9/44 |
| KR | 20120045650 A | * | 5/2012 | G05D 1/49 |
| KR | 20180035044 A | * | 4/2018 | B60W 60/005 |
| KR | 101922009 B1 | * | 11/2018 | B60W 60/0051 |
| KR | 20200118352 A | * | 10/2020 | B60K 35/60 |
| KR | 102219020 B1 | * | 2/2021 | B60K 35/60 |
| WO | WO-2015014116 A1 | * | 2/2015 | G03B 15/006 |
| WO | 2015/068032 A1 | | 5/2015 | |
| WO | WO-2016105640 A1 | * | 6/2016 | G06F 3/0346 |
| WO | WO-2017125514 A1 | * | 7/2017 | G05D 1/0016 |
| WO | 2018/116978 A1 | | 6/2018 | |
| WO | WO-2020204225 A1 | * | 10/2020 | B60K 35/60 |

* cited by examiner

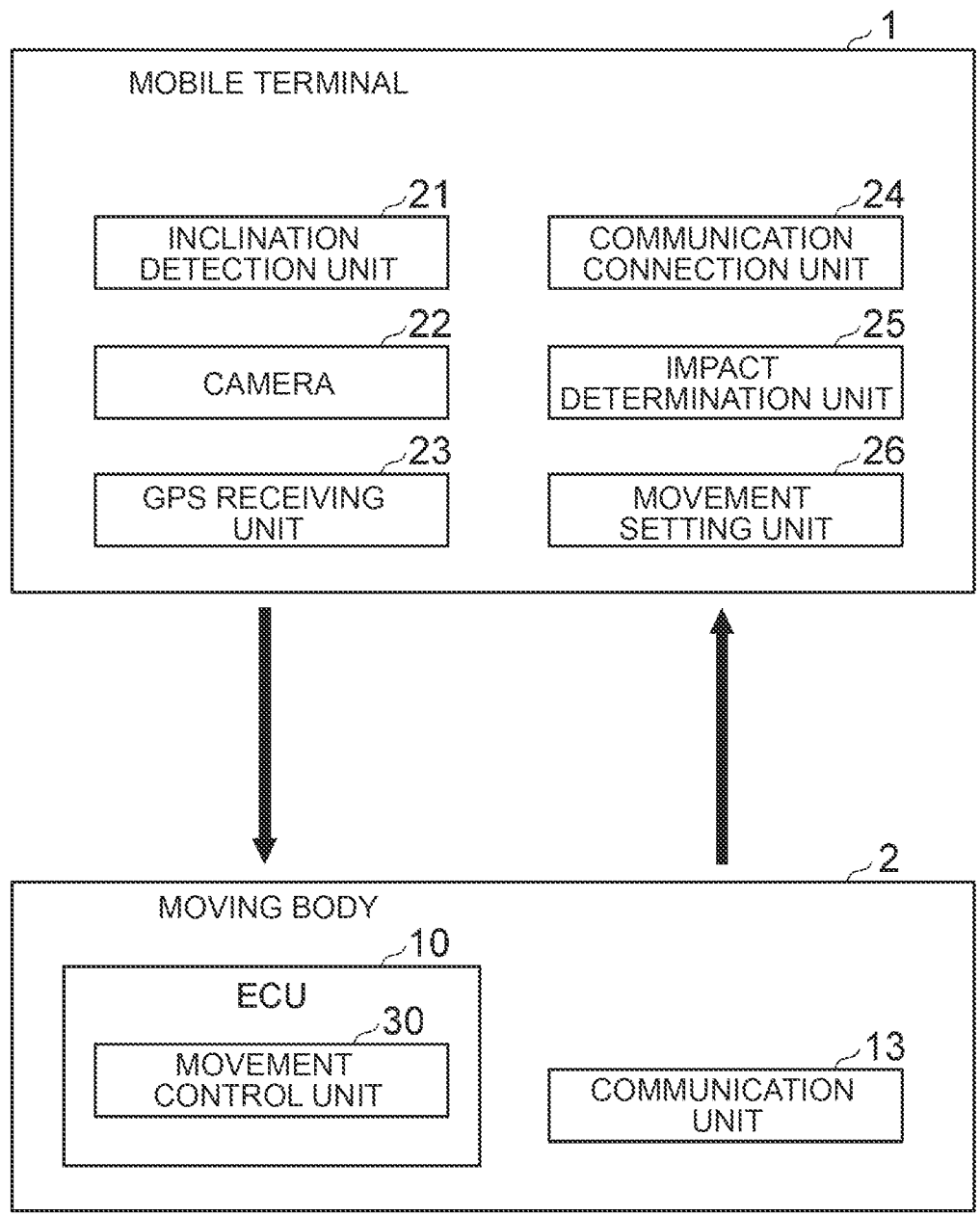

MOVING BODY OPERATION SYSTEM

CROSS-REFERENCE TO RELATED APPLICATION

This application claims priority to Japanese Patent Application No. 2022-184817 filed on Nov. 18, 2022, incorporated herein by reference in its entirety.

BACKGROUND

1. Technical Field

The present disclosure relates to a moving body operation system.

2. Description of Related Art

Conventionally, Japanese Unexamined Patent Application Publication No. 2022-063056 (JP 2022-063056 A) is known as a technical document related to a moving body operation system. In this publication, it is shown that a traveling direction of a vehicle and a speed of the vehicle are controlled by inclining a rod-shaped operating portion provided at the center of a platform-shaped floor plate on which an occupant of the vehicle gets on.

SUMMARY

On the assumption that autonomous driving or remote driving is performed, a moving body that is able to be boarded by a user and not provided with a driver's seat is considered. In such a moving body, it is desirable to make a mechanism in which, when an operation by the user is needed, the operation is possible.

One aspect of the present disclosure is a moving body operation system including a mobile terminal that is in communication connection with a moving body that is able to be boarded by a user. The moving body operation system includes: an inclination detection unit that detects an inclination direction and an inclination angle of the mobile terminal; a movement setting unit that sets a traveling direction of the moving body based on the inclination direction of the mobile terminal, and that sets a target speed or a target acceleration of the moving body based on the inclination angle of the mobile terminal; and a movement control unit that performs steering control of the moving body based on the traveling direction, and that performs speed control of the moving body based on the target speed or the target acceleration.

In the moving body operation system according to the aspect of the present disclosure, when the mobile terminal is located outside the moving body, the moving body may be prohibited from moving in a direction away from the mobile terminal that is in communication connection with the moving body.

According to the aspect of the present disclosure, in the moving body that is able to be boarded by the user and not provided with the driver's seat, it is possible for the user to operate the movement of the moving body by the mobile terminal.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram illustrating an exemplary configuration of an ECU of a mobile terminal and a moving body;

DETAILED DESCRIPTION OF EMBODIMENTS

Hereinafter, embodiments of the present disclosure will be described with reference to the drawings.

Figure 1:
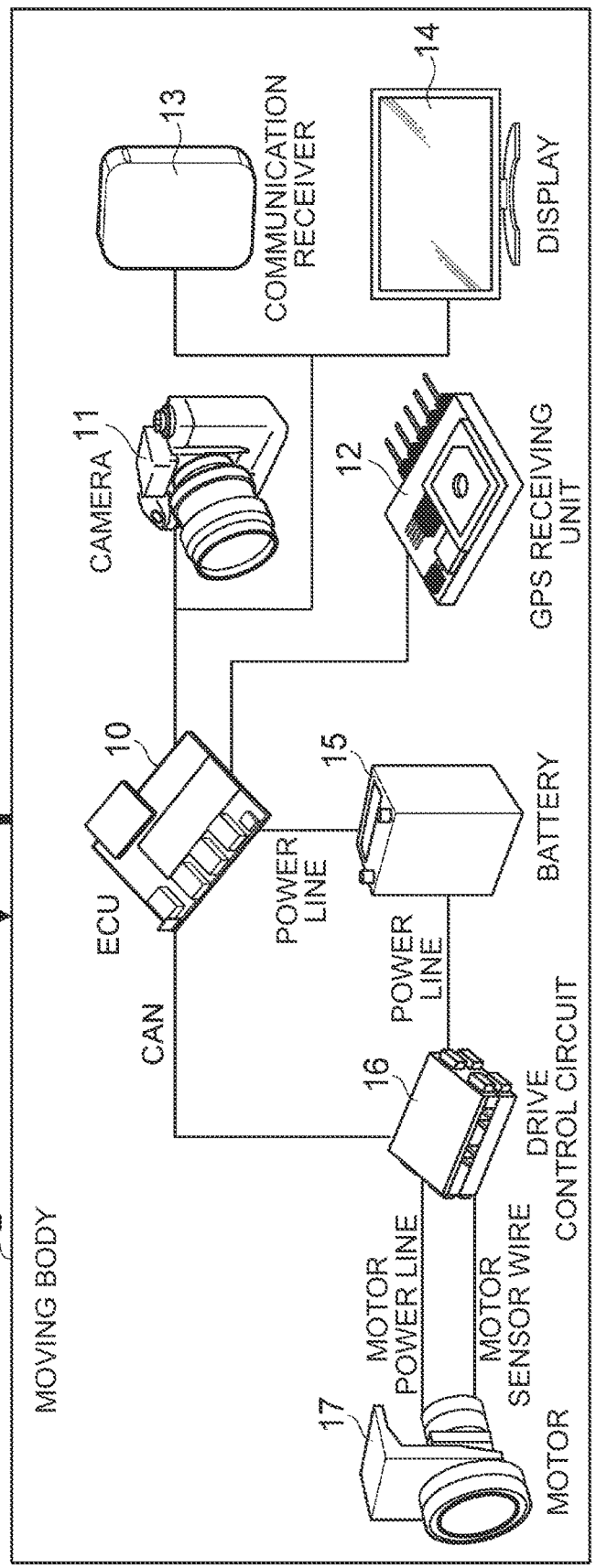
FIG. 1 is a diagram illustrating an example of a moving body operation system according to an embodiment.

FIG. 1 is a diagram illustrating an example of a moving body operation system according to an embodiment. The moving body operation system 100 illustrated in FIG. 1 includes a mobile terminal 1. The moving body operation system 100 is a system for operating the moving body 2 by the mobile terminal 1.

The mobile terminal 1 is, for example, a smartphone. The mobile terminal 1 is not necessarily required to have a telephone function, but is required to have a function of performing a communication connection with the moving body 2. The mobile terminal 1 may be a tablet type information terminal or a notebook type information terminal. The shape of the mobile terminal 1 is not particularly limited as long as it can be carried. Also, the owner of the mobile terminal 1 is not particularly limited. The mobile terminal 1 may be a property of a user who operates the moving body 2, may be a property of an owner of the moving body 2, or may be a property of a manufacturer or a management company of the moving body 2.

The moving body 2 is a mobility in which a user can ride in and travels on the ground. The moving body 2 may be a vehicle or a personal mobility. The moving body 2 may be a ship. The vehicle also includes a pedestal-type vehicle in which wheels for movement are provided on the pedestal. The moving body 2 may be mobility in which no driver's seat (driving operation device) is provided. In this case, the moving body 2 is automatically driven or remotely driven in a normal state. The moving body 2 may be provided with an emergency stop button.

As illustrated in FIG. 1, the moving body 2 includes a ECU 10, a camera 11, a GPS receiving unit 12, a communication unit 13, a display 14, a battery 15, a drive control circuit 16, and a motor 17. ECU 10 is an electronic control unit having Central Processing Unit (CPU) and a storage such as Read Only Memory (ROM) or Random Access Memory (RAM).

The camera 11 is a camera that captures an image of the outside of the moving body 2. GPS receiving unit 12 is a device that measures the position of the moving body 2 by receiving signals from positioning satellites. It is also possible to adopt Global Navigation Satellite System (GNSS) instead of Global Positioning System (GPS).

The communication unit 13 is a device for communicating with the mobile terminal 1. The communication unit 13 may be connectable to the Internet and other wireless networks, or may be capable of communicating with a server of a management center that manages the moving body 2. The display 14 is an in-vehicle display. The display 14 is provided, for example, on an instrument panel of the moving body 2. The display 14 may include a display external to the vehicle. The battery 15 is a battery that stores electric power of the moving body 2. The drive control circuit 16 is a circuit for controlling the drive of the motor 17 of the moving body 2. The motor 17 is an electric motor for moving the moving body 2. The motor 17 includes, for example, a steering motor for changing the direction of the wheels of the moving body 2 and a drive motor for rotating the wheels of the moving body 2.

FIG. 2 is a diagram illustrating an exemplary configuration of an ECU of a mobile terminal and a moving body. As illustrated in FIG. 2, the mobile terminal 1 includes an inclination detection unit 21, a camera 22, a GPS receiving unit 23, a communication connection unit 24, an impact determination unit 25, and a movement setting unit 26.

The inclination detection unit 21 detects the inclination direction and the inclination angle of the mobile terminal 1 by a gyro sensor or an acceleration sensor of the mobile terminal 1. The camera 22 is an imaging unit of the mobile terminal 1 capable of reading a two-dimensional barcode. GPS receiving unit 23 is a measuring unit that measures the position of the mobile terminal 1 by the same technique as GPS receiving unit 12 of the moving body 2 described above.

The communication connection unit 24 is a part that performs communication connection with the communication unit 13 of the moving body 2. For example, the mobile terminal 1 may execute a communication connection with the moving body 2 by reading a two-dimensional barcode displayed on the display 14 of the moving body 2 by the camera 22. The timing at which the two-dimensional barcode can be displayed may be limited. For example, the two-dimensional barcode may be displayed only when the autonomous driving function or the remote driving function of the moving body 2 is in the non-activated state.

The mobile terminal 1 may be operable or communicatively connectable to move the moving body 2 only for a certain period of time after reading the two-dimensional barcode and communicating with the moving body 2. That is, a time limit may be provided for the operation of the moving body 2 from the mobile terminal 1.

The impact determination unit 25 is a portion that determines whether or not the mobile terminal 1 has been subjected to an impact by the acceleration sensor of the mobile terminal 1 during a communication connection with the moving body 2. The impact determination unit 25 determines that the mobile terminal 1 has been subjected to an impact, for example, when the amount of change in acceleration of the mobile terminal 1 for a certain period of time (for example, 0.1 seconds) is equal to or greater than a predetermined threshold value.

When it is determined that the mobile terminal 1 has been subjected to an impact by the acceleration sensor of the mobile terminal 1 during the communication connection with the moving body 2, the impact determination unit 25 prohibits the operation of the mobile terminal 1 with respect to the moving body 2 and causes the moving body 2 to stop urgently. As a result, it is possible to secure fail-safe, such as when the user slides the mobile terminal 1 from his or her hand.

After prohibiting the operation with respect to the moving body 2 of the mobile terminal 1, for a certain period of time, when not subjected to an impact, the impact determination unit 25 may allow the operation with respect to the moving body 2 of the mobile terminal 1. Alternatively, the impact determination unit 25 may permit the operation of the moving body 2 of the mobile terminal 1 by the user's operation of releasing the prohibition on the mobile terminal 1. It should be noted that an emergency stop of the moving body 2 is not essential.

The movement setting unit 26 sets the traveling direction of the moving body 2 based on the inclination direction of the mobile terminal 1, and sets the target speed of the moving body 2 based on the inclination angle of the mobile terminal 1. The setting of the traveling direction of the moving body 2 may be set as a target tire angle or a target yaw rate in the left-right direction. For example, when the mobile terminal 1 is tilted to the left and right, a target tire angle or a target yaw rate in the left-right direction is set as a parameter relating to the traveling direction.

The movement setting unit 26 transmits a movement instruction including the traveling direction of the moving body 2 and the target speed of the moving body to the moving body 2 via the communication connection unit 24. The movement setting unit 26 may set the target acceleration instead of the target speed.

Note that the movement setting unit 26 may provide a restriction in the traveling direction of the moving body 2 that can be set. When the mobile terminal 1 is located outside the moving body 2, the movement setting unit 26 may prohibit the moving body 2 from proceeding in a direction away from the mobile terminal 1 being communicatively connected. That is, the movement setting unit 26 makes it possible to set only the traveling direction in which the moving body 2 approaches the mobile terminal 1 in communication connection. In the traveling direction approaching the mobile terminal 1, a range of a certain angle is allowed as a margin.

Figure 3A:
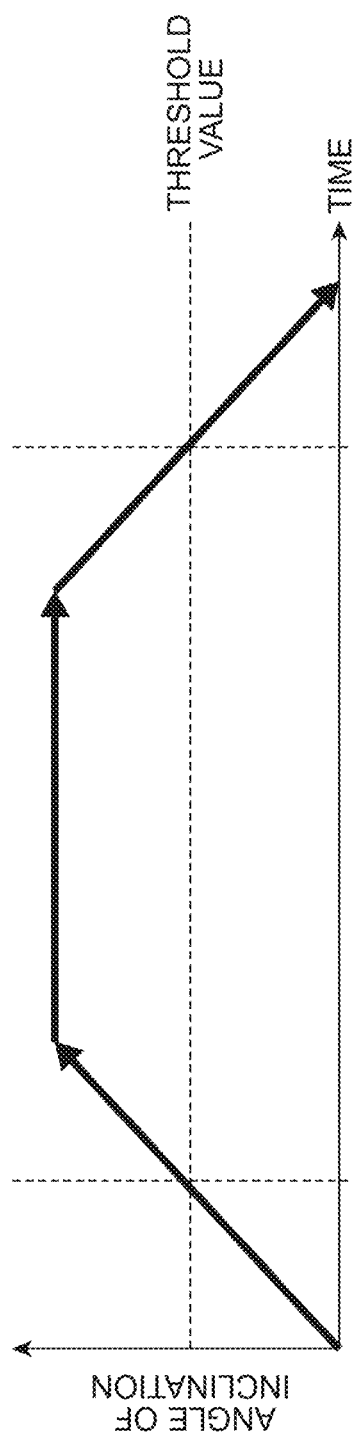
FIG. 3A is a graph showing an example of a temporal change in an inclination angle of the mobile terminal.
Figure 3B:
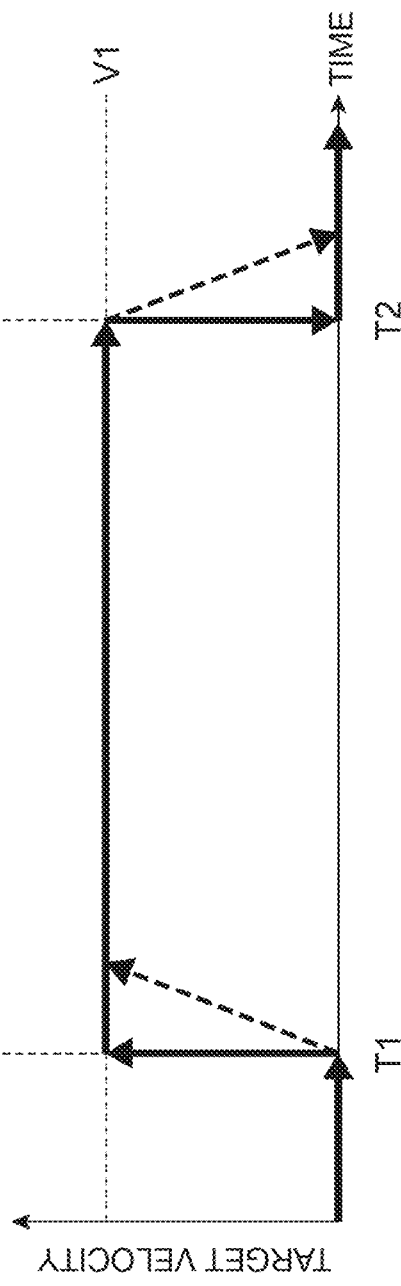
FIG. 3B is a graph showing an example of a target velocity change of the moving body.

Here, FIG. 3A is a graph showing an example of a temporal change in an inclination angle of the mobile terminal 1. FIG. 3B is a graph showing an example of a target velocity change of a moving body 2. FIG. 3B shows a situation in which a target velocity is changed in accordance with a temporal change in the tilt angle of the mobile terminal 1 in FIG. 3A. The tilt direction is not changed. As shown in FIG. 3A and FIG. 3B, the movement setting unit 26 changes the target velocity from 0 to V1 at the time T1 when the tilt angle of the mobile terminal 1 becomes equal to or greater than the threshold. The movement setting unit 26 changes the target velocity from V1 to 0 at the time T2 when the tilt angle of the mobile terminal 1 becomes equal to or greater than the threshold and less than the threshold.

As described above, the movement setting unit 26 may provide a margin between the start of inclination of the mobile terminal 1 and the reflection on the target speed. In addition, the movement setting unit 26 may set the change of the target speed in a plurality of stages by providing a plurality of thresholds, rather than in a single stage. Further, the movement setting unit 26 may gradually change the target velocity by providing a time-lag instead of switching the target velocity from 0 to V1 in a moment, as indicated by a dashed arrow in FIG. 3B.

Alternatively, the movement setting unit 26 may continuously change the target speed in accordance with the inclination angle of the mobile terminal 1. The movement setting unit 26 may set the target speed according to the input inclination angle by using the map data in which the inclination angle and the target speed are associated in advance. Although the case of the target speed has been described as an example, the same can be applied to the case where the target acceleration is used.

The movement setting unit 26 may prohibit an operation (instruction) on the moving body when the user having the mobile terminal 1 is located outside the moving body 2 and the distance between the mobile terminal 1 and the moving body 2 is a predetermined distance or more. The constant length is not particularly limited, but may be 3 m or 5 m or 10 m.

As illustrated in FIG. 2, ECU 10 of the moving body 2 includes a movement control unit 30. The movement control unit 30 performs steering control of the moving body 2 based on the traveling direction included in the movement instruction from the mobile terminal 1. The movement control unit 30 executes the steering control so that the moving body 2 moves in the traveling direction of the movement instruction under the control of the steering motor of the motor 17. Note that the restriction of the traveling direction of the moving body 2 may be performed not by the movement setting unit 26 of the mobile terminal 1 but by the movement control unit 30 of the moving body 2.

The movement control unit 30 controls the speed of the moving body 2 based on the target speed included in the movement instruction from the mobile terminal 1. The movement control unit 30 executes the speed control so that the moving body 2 becomes the target speed of the movement instruction by controlling the drive motor of the motor 17.

Next, a process of the moving body operation system 100 according to the present embodiment will be described referring to FIG. 4A and FIG. 4B. FIG. 4A is a diagram illustrating an example of a moving body operation process in a mobile terminal 1. The moving body operation processing in the mobile terminal 1 is executed, for example, when the mobile terminal 1 is communicatively connected to the moving body 2 and starts the operation of moving the moving body 2.

As shown in FIG. 4A, as an S1, the mobile terminal 1 detects the inclination direction and the inclination angle of the mobile terminal 1 by the inclination detection unit 21. The inclination detection unit 21 detects the inclination direction and the inclination angle of the mobile terminal 1 by the gyro sensor and the acceleration sensor of the mobile terminal 1.

As a S2, the mobile terminal 1 sets the traveling direction and the target speed of the moving body 2 by the movement setting unit 26. The movement setting unit 26 sets the traveling direction of the moving body 2 based on the inclination direction of the mobile terminal 1. At the same time, the movement setting unit 26 sets the target speed of the moving body 2 based on the inclination angle of the mobile terminal 1. As a S3, the mobile terminal 1 transmits a movement instruction to the moving body 2 via the communication connection unit 24. After that, the mobile terminal 1 ends the current moving body operation process and repeats the process from S1.

Figure 4B:
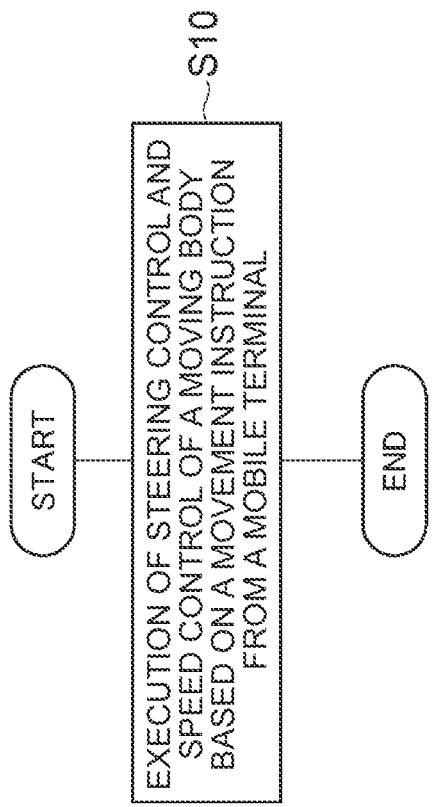
FIG. 4B is a flowchart showing an example of a moving body operation process in an ECU of a moving body.
Figure 4A:
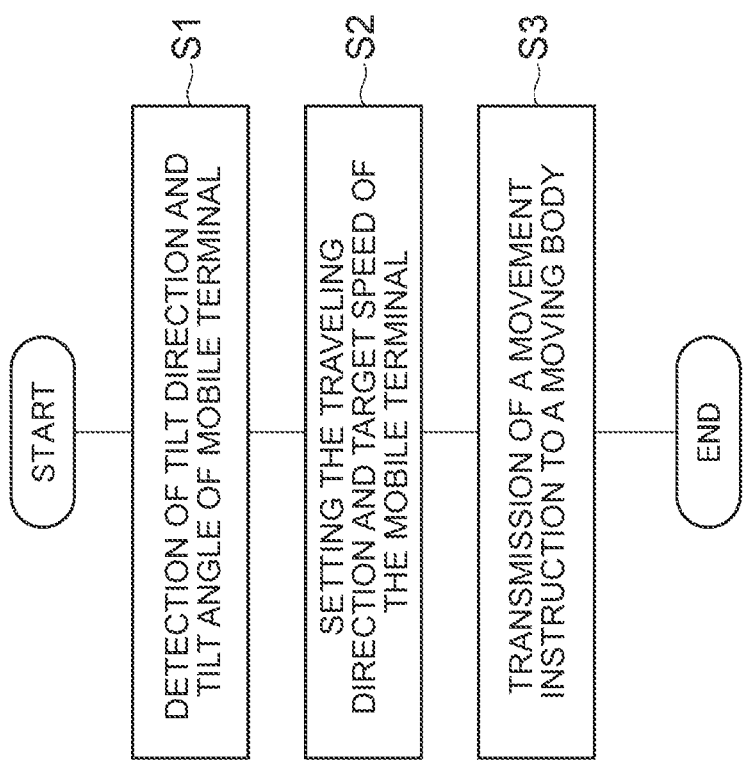
FIG. 4A is a flowchart showing an example of a moving body operation process in a mobile terminal.

FIG. 4B is a flow chart illustrating an exemplary of a moving body operating process in a ECU 10 of a moving body 2. The moving body operation processing in the moving body 2 is executed when a movement instruction is received from the mobile terminal 1 that is communicatively connected.

As illustrated in FIG. 4B, the mobile terminal 1 performs, as an S10, steering control and velocity control of the moving body 2 by the movement control unit 30. The movement control unit 30 executes the steering control so that the moving body 2 moves in the traveling direction of the movement instruction under the control of the steering motor of the motor 17. At the same time, the movement control unit 30 executes the speed control so that the moving body 2 becomes the target speed of the movement instruction by the control of the drive motor of the motor 17.

According to the moving body operation system 100 according to the present embodiment described above, the mobile terminal 1 can operate the movement of the moving body 2. Therefore, the user can operate the movement of the moving body 2 not only from the inside but also from the outside of the moving body 2. Therefore, for example, in a case where the moving body 2 is mobility in which no driver's seat (driving operation device) is provided, when the user needs to operate the movement of the moving body 2, the moving body operation system 100 allows the user to operate the movement of the moving body 2 by the mobile terminal 1.

Figure 5A:
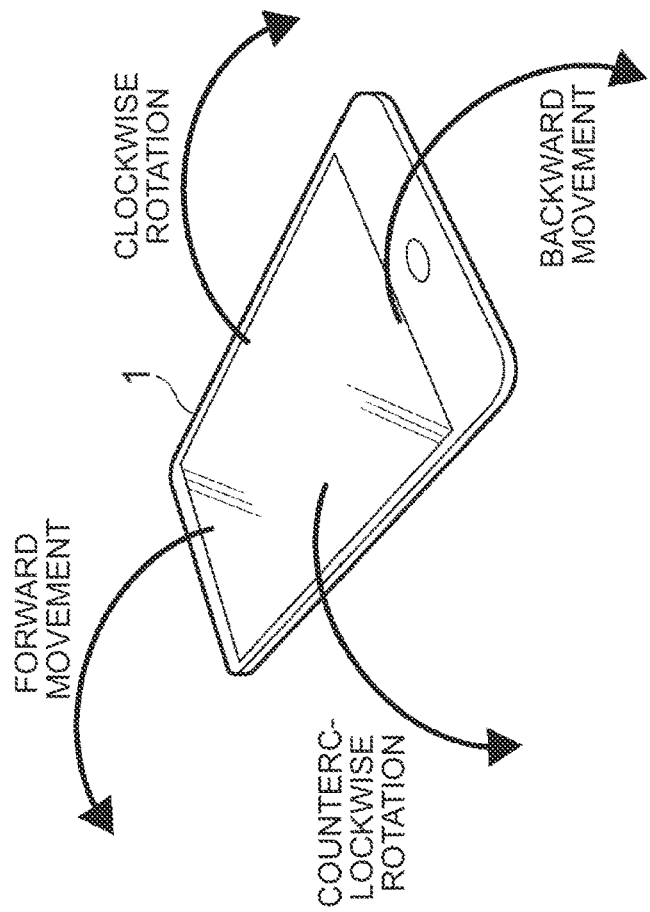
FIG. 5A is a diagram for illustrating an operation of the moving body according to an inclination of a mobile terminal.

FIG. 5A is a diagram for explaining the manipulation of the moving body 2 by the inclination of the mobile terminal 1. As illustrated in FIG. 5A, the moving body operation system 100 can set the traveling direction and the target speed of the moving body 2 by the inclination of the mobile terminal 1. According to this method, when the mobile terminal 1 is a small terminal, the user can operate the movement of the moving body 2 with one hand. Further, since the moving method of the mobile terminal 1 and the traveling direction and speed of the moving body 2 are one-to-one correspondence, the operation is intuitive and easy to understand for the user. Furthermore, the user does not have to view the screen of the mobile terminal 1 during the operation. Therefore, even when the user is outside the moving body 2, the user can operate the moving of the moving body 2 while concentrating on checking the situation around the moving body 2.

Further, when the mobile terminal 1 is determined to have been subjected to an impact by the acceleration sensor of the mobile terminal 1 during the communication connection between the mobile terminal 1 and the moving body 2, the moving body operation system 100 prohibits the operation of the mobile terminal 1 on the moving body 2. Therefore, it is possible to secure fail-safe when the user slides the mobile terminal 1 from his/her hand.

In addition, in the moving body operation system 100, a user having the mobile terminal 1 is located outside the moving body 2. When the distance between the mobile terminal 1 and the moving body 2 is a certain distance or more, the moving body operation system 100 prohibits an operation (instruction) on the moving body 2 from the mobile terminal 1. As a result, security against takeover from a remote location can be enhanced.

In addition, when the mobile terminal 1 is located outside the moving body 2, the moving body operation system 100 prohibits the moving body 2 from proceeding in a direction away from the mobile terminal 1 that is being communicatively connected. Accordingly, the movement of the moving body 2 can be restricted in a direction that is easy for the user to confirm.

Although the embodiments of the present disclosure have been described above, the present disclosure is not limited to the above-described embodiments. The present disclosure may be embodied in various forms with various changes and modifications, including the above-described embodiments, based on the knowledge of those skilled in the art.

Figure 5B:
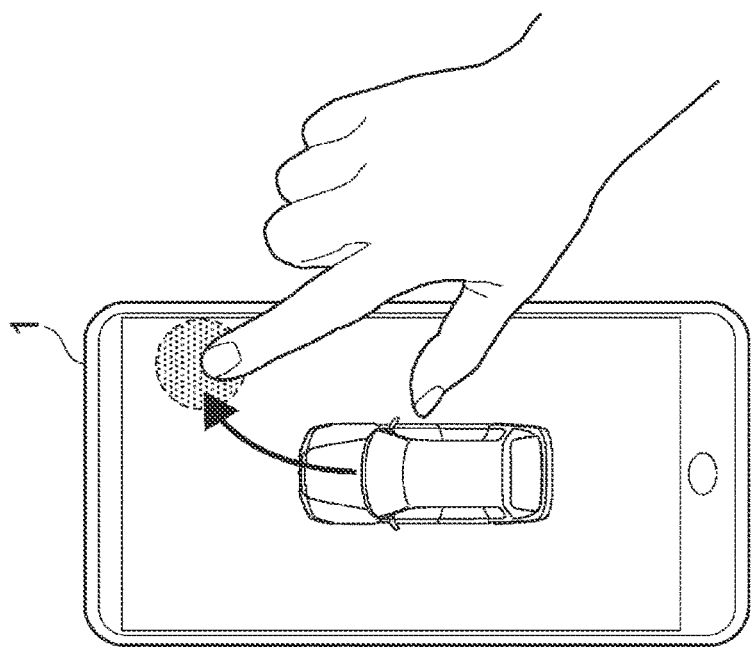
FIG. 5B is a diagram for illustrating an operation of a moving body by touching a mobile terminal.

For example, the operation of moving the moving body 2 may be performed by touching the touch display of the mobile terminal 1. FIG. 5B is a diagram for explaining an operation of the moving body 2 by touching the mobile terminal 1. As shown in FIG. 5B, the moving body operation system 100 may be capable of operating the moving body 2 by touching the mobile terminal 1. According to this method, it is possible to operate the movement of the moving body 2 by touching a position where the moving body 2 is desired to be moved with reference to the moving body 2 displayed on the display of the mobile terminal 1. Therefore, as compared with the operation by the inclination of the mobile terminal 1, the operation of advancing and retreating the moving body 2 becomes easier.

In addition, as fail-safe, the moving body operation system 100 may be able to operate the movement of the moving body 2 by tilting only while the user touches a touch display or a button of the mobile terminal 1. When the user does not touch the touch display or the button of the mobile terminal, the operation of the mobile terminal 1 with respect to the moving body 2 is stopped. When the user releases his/her hand from the touch display or button of the mobile terminal while the moving body 2 is moving, the moving body 2 may be stopped.

Figure 6:
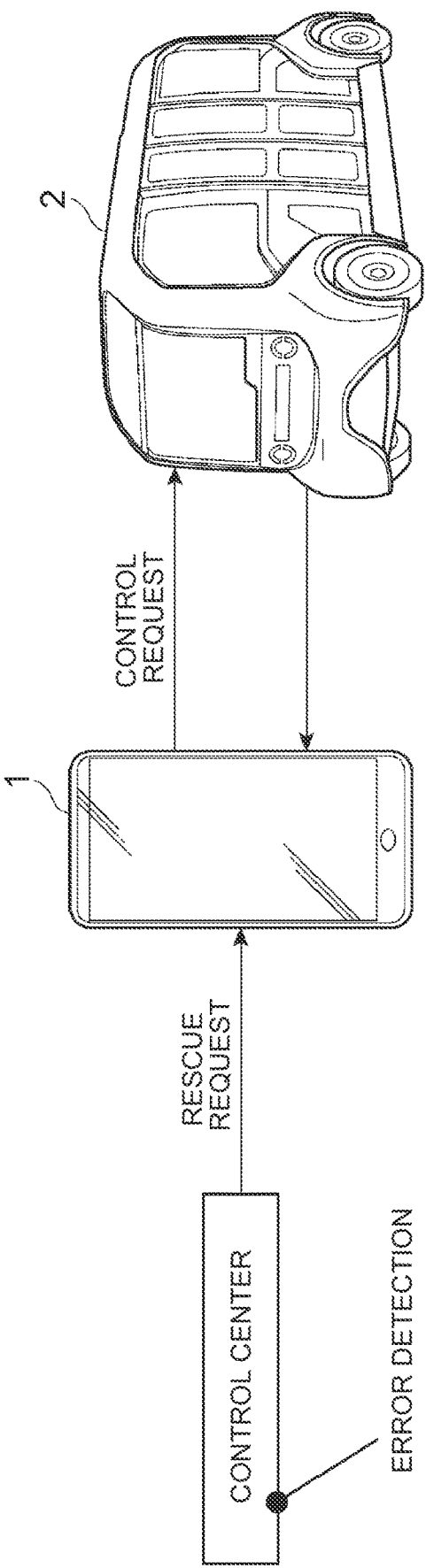
FIG. 6 is a diagram for illustrating an operation of the moving body from the outside by the mobile terminal in emergencies.

FIG. 6 is a diagram for explaining an operation of the moving body 2 from the outside by the mobile terminal 1 in an emergency. The operation of moving the moving body 2 by the mobile terminal 1 may be executed only when a rescue request is received from a management center that manages the moving body 2. The management center makes a rescue request to the mobile terminal 1 of the predetermined user when the abnormality of the moving body 2 is detected. At the same time, the management center causes the moving body 2 to display the two-dimensional barcode. The user can operate the movement of the moving body 2 by making a control request to the moving body 2 by reading the two-dimensional barcode of the moving body 2 by the camera 22 of the mobile terminal 1.

What is claimed is:

1. A mobile terminal comprising:
 a gyro sensor and an acceleration sensor that detect an inclination direction and an inclination angle of the mobile terminal;
 a processor configured to:
  set a traveling direction of a moving body based on the inclination direction of the mobile terminal, and set a target speed based on map data in which the inclination angle and the target speed are associated in advance;
  cause the moving body to travel in the set traveling direction, and at the set target speed;
  prohibit an operation of the mobile terminal with respect to the moving body in response to detection of an impact by the acceleration sensor while the mobile terminal is in communication connection with the moving body.

2. The mobile terminal according to claim 1, further comprising a camera,
 wherein the processor is configured to allow a communication connection with the moving body for a certain period of time in response to reading a two-dimensional barcode displayed on a display of the moving body by the camera.

3. The mobile terminal according to claim 1, wherein when a distance between the mobile terminal and the moving body is equal to or greater than a certain distance, the operation of the mobile terminal with respect to the moving body is prohibited.

4. The mobile terminal according to claim 1, wherein when the mobile terminal is located outside the moving body, the moving body is prohibited from moving in a direction away from the mobile terminal that is in communication connection with the moving body.

5. The mobile terminal according to claim 1, wherein the processor is configured to allow the communication connection with the moving body in response to no detection of the impact to the mobile terminal for a predetermined period after prohibiting the operation with respect to the moving body.

6. The mobile terminal according to claim 1, wherein the processor is configured to allow the communication connection with the moving body in response to a user's operation of releasing a prohibition on the mobile terminal.

7. The mobile terminal according to claim 1, wherein the processor is configured to set the target speed with a predetermined delay after a start of an inclination of the mobile terminal.

8. The mobile terminal according to claim 1, wherein the processor is configured to change the target speed in a plurality of stages.

9. The mobile terminal according to claim 1, wherein the processor is configured to continuously change the target speed in accordance with a change of the detected inclination angle.

10. A mobile terminal comprising:
 a gyro sensor and an acceleration sensor that detect an inclination direction and an inclination angle of the mobile terminal;
 a camera; and
 a processor configured to:
  set a traveling direction of a moving body based on the inclination direction of the mobile terminal, and set a target speed based on map data in which the inclination angle and the target speed are associated in advance;
  cause the moving body to travel in the set traveling direction, and at the set target speed; and
  allow a communication connection with the moving body for a certain period of time in response to reading a two-dimensional barcode displayed on a display of the moving body by the camera.

11. A mobile terminal comprising:
 a gyro sensor and an acceleration sensor that detect an inclination direction and an inclination angle of the mobile terminal;
 a touch display;
 a processor configured to;
  set a traveling direction of a moving body based on the inclination direction of the mobile terminal, and set a target speed based on map data in which the inclination angle and the target speed are associated in advance;
  determine whether a user touches the touch display;
  cause the moving body to travel in the set traveling direction, and at the set target speed; and
  prohibit an operation of the mobile terminal with respect to the moving body in response to the user not touching the mobile terminal.

* * * * *